United States Patent [19]
Yamaguchi et al.

[11] Patent Number: 6,141,155
[45] Date of Patent: Oct. 31, 2000

[54] REFRACTIVE INDEX DISTRIBUTION TYPE OPTICAL ELEMENT AND REFRACTIVE INDEX DISTRIBUTION TYPE ROD LENS ARRAY

[75] Inventors: Jun Yamaguchi; Shuya Kogi, both of Osaka, Japan

[73] Assignee: Nippon Sheet Glass Co., Ltd., Osaka, Japan

[21] Appl. No.: 09/511,639

[22] Filed: Feb. 22, 2000

Related U.S. Application Data

[63] Continuation of application No. PCT/JP99/03748, Jul. 12, 1999.

[30] Foreign Application Priority Data

Jul. 16, 1998 [JP] Japan ................................. 10-202113
Mar. 16, 1999 [JP] Japan ................................. 11-070757

[51] Int. Cl.[7] .............................. G02B 3/00; G02B 6/02; G02B 6/18
[52] U.S. Cl. .......................................... 359/652; 385/124
[58] Field of Search .................................. 359/652–654, 359/885; 385/115–116, 119, 123–124; 65/30.1, 30.13, 400, 440; 427/126.1, 126.5; 106/286.1, 286.3

[56] References Cited

U.S. PATENT DOCUMENTS

| | | | |
|---|---|---|---|
| 4,971,423 | 11/1990 | Nakata et al. | ........................... 385/124 |
| 5,387,433 | 2/1995 | Balian et al. | ........................ 427/126.3 |
| 5,818,644 | 10/1998 | Noda | ....................................... 359/642 |

FOREIGN PATENT DOCUMENTS

| | | |
|---|---|---|
| 63-301901 | 12/1988 | Japan . |
| 10-139472 | 5/1998 | Japan . |

*Primary Examiner*—Georgia Epps
*Assistant Examiner*—Jordan M. Schwartz
*Attorney, Agent, or Firm*—Kanesaka & Takeuchi

[57] ABSTRACT

A refractive index distribution type optical element has a core/cladding structure produced with the ion exchange method. The element includes colorant of metal oxides in cladding glass thereof. The cladding glass consists of base glass and the colorant of the metal oxides comprising: 0.3 to 4.0 wt. % CoO; 1.0 to 12.0 wt. % $Fe_2O_3$; 0.0 to 2.0 wt. % NiO; and 0.0 to 0.2 wt. % $Cr_2O_3$ when the total amount of the base glass except for the colorants is taken as 100 wt. %. The refractive index distribution type optical element is prevented from deterioration of the optical properties occurring at portions having the refractive index departing the regular parabolic distribution and also is prevented from entrance of the flare light. The element is provided with good resolution even when employed for an optical device using a white light, and a rod lens array formed with the refractive index distribution type optical element is provided.

11 Claims, 7 Drawing Sheets

CoO 1.0 wt%   $Fe_2O_3$ 3.0 wt%

CoO 1.0、Fe₂O₃ 2.0、NiO 0.5 wt%

CoO 1.0、Fe₂O₃ 10.0 wt%

CoO 1.0、Fe$_2$O$_3$ 6.0、NiO 1.0 wt%

CoO 2.0 wt%     Fe$_2$O$_3$ 6.0 wt%

CoO 3.5 wt%、Fe$_2$O$_3$ 3.0 wt%

CoO 3.5 wt%、Fe$_2$O$_3$ 10.0 wt%

CoO 1.0, Fe$_2$O$_3$ 3.0, NiO 1.75 wt%

CoO 1.0, Fe$_2$O$_3$ 10.0, NiO 1.75 wt%

CoO 1.0 wt%

CoO 1.0 wt%  NiO 0.5 wt%

REFRACTIVE INDEX DISTRIBUTION TYPE OPTICAL ELEMENT AND REFRACTIVE INDEX DISTRIBUTION TYPE ROD LENS ARRAY

CROSS REFERENCE TO RELATED APPLICATION

This is a continuation application of PCT/JP99/03748 filed on Jul. 12, 1999.

FIELD OF THE INVENTION

The present invention relates to a refractive index distribution type optical element containing a core/cladding structure having a refractive index distributed in a radial direction and a refractive index distribution type rod lens array, especially to modification the glass composition for the cladding.

BACKGROUND OF THE INVENTION

A refractive index distribution type optical element of which a refractive index varies corresponding to a parabolic distribution in a radial direction, for example a light focusing lens, even when the lens has a flat face, is provided with the same imaging function as a spherical lens. The optical device has an advantage that it is easy to produce a lens having an extremely small diameter and a single focus. The refractive index distribution type optical element is widely applied for an optical head of an optical device including an optical printer, a facsimile, a laser printer, and the like. Such refractive index distribution type optical elements include a refractive index distribution type rod lens, a refractive index distribution type fiber and the like.

To produce the refractive index distribution type optical element, an ion exchange method of soaking a glass rod into a molten salt to distribute the refractive index is widely applied. For example, a rod lens having distribution of the refractive index can be produced by soaking a glass rod containing cations including $Li^+$, $Tl^+$, $Cs^+$, $Ag^+$ and the like into the molten salt including sodium nitrate and potassium nitrate and the like to exchange the cations contained in the glass for those in the molten salt.

In stead of using the molten salt, a rod lens containing the core/cladding structure having distribution of the refractive index can be produced by heating it to exchange the cations between the rod glass and the layer of the cladding glass while or after forming the core/cladding rod lens which is formed due to covering the aforementioned glass rod with a layer of the cladding glass containing sodium ion or potassium ion. The core/cladding rod lens can be produced with the double crucible method, pipe rod method and the like.

When the rod lens is produced with the ion exchange method, since the ion exchange process progresses principally due to diffusing phenomenon, the refractive index often departs from the parabolic distribution (quadric distribution) mainly around the side face thereof FIG. 1 shows the sectional view of the core/cladding rod lens and the distribution of the refractive index thereof. According to FIG. 1, the lens has a circular cross section and the lens contains the core in the center portion thereof and the coaxial cladding surrounding the core. A curve of distribution of the refractive index is shown below the sectional view of the lens. The abscissa r expresses the radial distance from the center of the core and the ordinate n expresses the refractive index. The glass composition of the core and the cladding before the ion exchange treatment is determined so that the refractive index continuously varies at the boundary between the core and the cladding after ion exchange treatment especially when the thickness of the layer of the cladding is made relatively larger in comparison with the diameter of the core.

When the data including the image is transmitted, beams passing through portions having the refractive index departing from the regular parabolic distribution in the vicinity of the side face of the core cause optical distortion and aberration to deteriorate the optical properties of the refractive index distribution type rod lens. And the light entering the refractive index distribution type rod lens through parts adjacent to the side face thereof (generally called as the flare light) also deteriorate the optical properties of the refractive index distribution type rod lens.

In order to prevent deterioration of the optical properties of the lens and entrance of the flare light, the Japanese Patent Publication S63-301901A makes disclosure of a method of preventing the entrance of the flare light in that a light absorbent layer of the glass including colorants consisting of metal ion including Mn, Cr, Co, Ni, Fe, Cu, Ag, Ti, Pb, Ru, Cd, V, Mo and the like to prevent the entrance of the flare light is formed in the cladding while producing the refractive index distribution type optical element by soaking the core/cladding glass rod respectively containing the cation of $Li^+$ and the like into the molten salt, for example the molten salt comprising the sodium nitrate, for the determined periods to exchange the lithium ion contained in the core/cladding glass rod for the sodium ion existing in the molten salt. The colorant used in an example of the invention of the Japanese Patent Publication S63-301901A which includes MnO, CoO or a combination of CoO and MnO is available for the optical device employing the monochromatic light for the illuminant, while it is insufficiently provided with the resolution when used for the optical device employing the white light for the illuminant.

In the Japanese Patent Publication H10-139472A proposes a refractive index distribution type optical element having a cladding glass layer consisting of a light absorbent glass including CoO, MnO and $Cr_2O_3$ as the colorant, e.g. 1.5 wt. % CoO, 1.0 wt. % MnO and 0.4 wt. % $Cr_2O_3$, so as to prevent the entrance of the flare light and to improve the external diameter precision. The colorant easily causes devitrification to the core and the cladding glass, and it has limited applications for the glass composition of the core and the cladding glass.

OBJECT AND SUMMARY OF THE INVENTION

It is an object of the present invention to provide a refractive index distribution type optical element, which is prevented from deterioration of the optical properties occurring at portions having the refractive index departing the regular parabolic distribution and also is prevented from entrance of the flare light so that the optic is provided with good resolution even when employed for an optical device using a white light, and to provide a rod lens array formed with the refractive index distribution type optical element.

The refractive index distribution type optical element of the present invention has a core/cladding structure produced with the ion exchange method. The element includes colorant of metal oxides, in cladding glass. The cladding glass consists of base glass and the colorants of the metal oxides including:

0.3 to 4.0 wt. % CoO;
1.0 to 12.0 wt. % $Fe_2O_3$;
0.0 to 2.0 wt. % NiO; and 0.0 to 0.2 wt. % $Cr_2O_3$ when the total amount of the base glass except for the colorants is taken as 100 wt. %.

The refractive index distribution type rod lens array of the present invention is produced in such a manner that the plural refractive index distribution type optical elements as described above are arranged so that all optical axes thereof are mutually parallel and, then, adhered.

In the present invention, the colorant of the metal oxides (hereinafter, it may simply called as the colorant) contained in the cladding glass is added to the base glass composition (the composition of the basic glass materials except for the colorant) as an extra component amount of which is expressed by weight percentage based on the total amount of the base glass of the cladding, that is, weight percentage of the colorant taking the total amount of the base glass as 100 wt. % (hereinafter, it may simply called as an "additive amount").

The refractive index distribution type optical element of the present invention prevents the deterioration of the optical properties occurring at the portion having the refractive index departing from the regular parabolic distribution, and it also prevents the entrance of the flare light. Especially, since the light having a wavelength over the entire visible range can be effectively removed by adding CoO, $Fe_2O_3$ and, if needed, NiO and/or $Cr_2O_3$ in the determined amount, the refractive index distribution type optical element containing the core/cladding structure which is provided with the good resolution even when used in the optical devices employing the white light for the illuminant can be produced.

DESCRIPTION OF THE PREFERRED EMBODIMENTS

Figure 1:
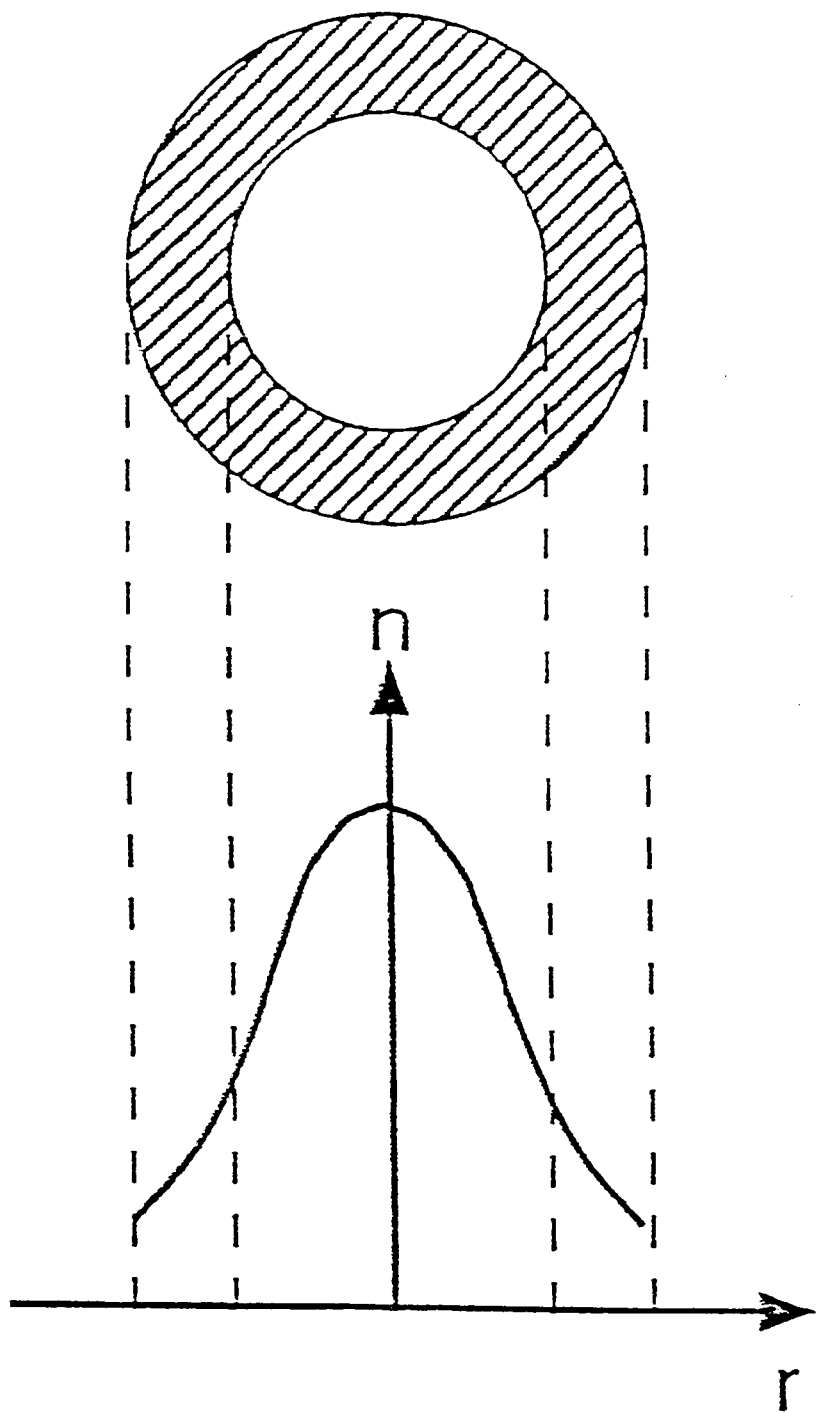
FIG. 1 shows a curve of dispersion of the refractive index of the refractive index distribution type rod lens.

The description will be firstly made as regard to a colorant comprising metal oxide contained in the cladding glass.

The metal oxide contained in the cladding glass as the colorant is selected which is in principle free of suffering the ion exchange. Generally, the glass varies in the density, viscosity, thermal expansivity and the like as the rise of the content of the colorant. A large content of the colorant easily causes devitrification while forming the core/cladding glass rod, for example during the spinning process using a double crucible. Thus, the content of the colorant is preferable to be possibly lowered within such a range as not to lose the absorption of the light having a determined wavelength. Moreover, the colorant is preferable to be reduced so as to let the refractive index which is developed with the ion exchange possibly close to the parabolic distribution. From this point of view, CoO is suitable for the colorant.

When including CoO, the glass becomes liable to strongly absorb the light having a wavelength of 520 to 680 nm because of $Co^{2+}$ ion. Since the strength of the absorption depends on the content of CoO, as the content of CoO becomes large, the glass can effectively remove the light which enters the cladding layer to make no contribution to imaging. At this point, with the aforementioned considerations, the content of CoO is in a range of 0.3 to 4.0 wt. %, preferably in a range 0.4 to 2.5 wt. %, more preferably in a range of 0.5 to 1.5 wt %.

When the white light is used for the illuminant, it is necessary to consider the removal of the light having wavelengths over the entire visible range. When CoO mentioned above is used alone, the absorption of the light having a wavelength of equal to or less than 500 nm is insufficient. Fe ion is given as a metal ion absorbing the light having a short wavelength of equal to or less than 500 nm. $Fe^{3+}$ strongly absorbs the light having a wavelength of 380 to 460 nm. $Fe_2O_3$ is essentially contained for the purpose of absorbing the light having a relatively short wavelength. However, since the glass becomes easy to lose the clarity when containing $Fe_2O_3$ too much, so, it is not preferable to use $Fe_2O_3$ too much. The content of $Fe_2O_3$ is determined within the range of 1.0 to 12.0 wt. % depending on the composition of the base glass of the cladding.

That is, when glass containing a large amount of MgO is used for the base glass of the cladding, since the potential of occurring devitrification is significantly high, $Fe_2O_3$ is preferable to be added in an amount of 1.0 to 4.0 wt. % in case that the content of MgO is equal to or higher than 5 wt. % when the total amount of the base glass is taken as 100 wt. %. Especially when NiO is added as a colorant, the content of $Fe_2O_3$ is preferably in a range of 1.0 to 2.5 wt. %. While, when the colorant does not include NiO, the content of $Fe_2O_3$ is preferably in a range of 1.5 to 4.0 wt. %.

In case of using glass having a small amount of MgO for the base glass of the cladding, since the potential of occurring devitrification is decreased, extra $Fe_2O_3$ can be further added. Since $Fe_2O_3$ has less absorptivity than CoO, the content of $Fe_2O_3$ is preferable to be made as large as possible so that absorption of the light having a wavelength of 380 to 460 nm is developed to improve the resolution over this wavelength range. In case that the content of MgO is less than 5 wt. % when the total amount of the base glass is taken as 100 wt. %, $Fe_2O_3$ can be added in an amount up to 12.0 wt. %. Especially when the colorant includes NiO given later, $Fe_2O_3$ is preferable to be added in an amount of 6.0 to 12.0 wt. %.

In the present invention, $Co^{2+}$ ion and $Fe^{3+}$ ion are particularly incorporated in the cladding glass to effectively remove the light having wavelengths over the entire visible range.

NiO, which is not essential component, is preferable to be added because NiO absorbs the light having a wavelength in a visible range of 420 to 500 nm which extends between ranges absorbed by CoO and by $Fe_2O_3$ when incorporated with CoO and $Fe_2O_3$. When the content of NiO is too large, the glass easily loses the clarity. Therefore, the content of NiO is preferable to be made as small as possible. NiO is included in an amount of 0.0 to 2.0 wt. %, preferably in an amount of 0.2 to 2.0 wt. %, more preferably 0.2 to 1.0 wt. %.

The other metal oxide absorbing the light having a short wavelength within the visible range is known as Cr and Mn. Mn and Cr respectively can be added as extra complements to Co, Fe and Ni in the manner given as follows.

$Cr_2O_3$, which is not an essential component, strongly absorbs the light having a wavelength of 380 to 430 like as $Fe_2O_3$, and its absorptivity is higher than that of $Fe_2O_3$. While, $Cr_2O_3$ is liable to cause devitrification to the cladding glass especially to the glass including lithium. $Cr_2O_3$ can be added in an amount up to 0.2 wt. % without causing the devitrification to the glass.

MnO, which is not an essential component, strongly absorbs the light having a wavelength of 440 to 500 nm when existing in the form of $Mn^{3+}$ ion in the glass. While, when coexisting with $Fe_2O_3$, MnO exists in the form of $Mn^{2+}$ and has little or no absorptivity of the light. Therefore, though safely added in an amount up to 1.0 wt. %, MnO is not suitable for the colorant.

The desirable composition of the base glass of the cladding containing the aforementioned colorant before ion exchange is shown as follows, provided the total amount of the base glass before the ion exchange treatment is taken as 100 wt %.

[composition of the base glass of the cladding glass (before ion exchange treatment)]

0 wt. % $Li_2O$;

14 to 28 wt. % $Na_2O$;

2.5 to 15 wt. % MgO;

2 to 10 wt. % BaO;

0 to 25 wt. % PbO;

2 to 10 wt. % $TiO_2$; and 45 to 60 wt. % $SiO_2$.

While, the desirable composition of the core glass before ion exchange treatment is shown as follows, provided the total amount is taken as 100 wt. %.

[composition of the core glass (before ion exchange treatment)]

3 to 12 wt. % $Li_2O$;

0 to 15 wt. % $Na_2O$;

2.5 to 15 wt. % MgO;

2 to 10 wt. % BaO;

0 to 25 wt. % PbO;

2 to 10 wt. % $TiO_2$; and 45 to 60 wt. % $SiO_2$.

As the result of ion exchange treatment, the composition of the cladding glass and the core glass is distributed not uniformly but heterogeneously in the radial direction, particularly in respect to $Li_2O$ and $Na_2O$. The base glass of the cladding and the core glass of the refractive index distribution type optical element produced with the ion exchange treatment have the "average" composition given as follows respectively. (It should be noted that a total % thereof is 100 wt. %.) It is preferable that the content of $Na_2O$ in the cladding glass is larger than that in the core glass and the content of $Li_2O$ in the core glass is more than that in the cladding glass. At this point, "average" means a state where the composition in the cladding glass and the core glass given as follows is supposed to be distributed uniformly.

[average composition of the base glass of the cladding (after ion exchange treatment)]

0.5 to 12 wt. % $Li_2O$;

14 to 28 wt. % $Na_2O$;

2.5 to 15 wt. % MgO;

2 to 10 wt. % BaO;

0 to 25 wt. % PbO;

2 to 10 wt. % $TiO_2$; and 45 to 60 wt. % $SiO_2$.

[average composition of the core glass (after ion exchange treatment)]

2 to 9 wt. % $Li_2O$;

0.5 to 25 wt. % $Na_2O$;

2.5 to 15 wt. % MgO;

2 to 10 wt. % BaO;

0 to 25 wt. % PbO;

2 to 10 wt. % $TiO_2$; and 45 to 60 wt. % $SiO_2$.

The refractive index distribution type optical element of the present invention can be produced in such a manner that the core/cladding glass rod is firstly produced in accordance with the conventional method using the raw cladding glass having the determined composition prepared due to adding the colorant into the base glass and the raw core glass, and then, it is exposed to the melting salt, e.g. sodium nitrate, for determined periods so as to exchange the lithium ion existing in the core/cladding glass for the sodium ion existing in the melting salt.

The refractive index distribution type optical element of the present invention is preferable to consist of the core glass having a diameter of 100 to 1000 μm and the cladding glass layer having a thickness of 1 to 100 μm, provided the thickness of the cladding glass layer is preferably 1 to 25% of the diameter of the core glass, and which has a constant of the refractive index (g) of 0.1 to 4, and the glass of the cladding glass layer having a thickness of 100 μm has transmittance of equal to or less than 75% against the entire light having a wavelength of 380 to 680 nm.

The refractive index distribution type rod lens array of the present invention is produced in such a manner that 50 to 1000 pieces of aforementioned refractive index distribution type optical element of the present invention are arranged in a single column or in two to four columns to form a zigzag configuration, in which the optical axes of every pieces are mutually parallel and the both ends of each piece respectively form a flat surface, and mutually adhered.

EXAMPLES

Hereinafter, the mode of carrying out the present invention will be described referring to examples.

Example 1, Comparative Examples 1 through 4

The cladding glass having the composition shown in Table 1 and 3, which is in form of a hollow cylindrical shape having a thickness of 0.5 mm and an internal diameter of 30.5 mm, and the core glass rod having a diameter of 30 mm which is inserted thereinto are heated in the electric furnace at 650° C. and drawn by the drawing roller so that the cladding glass having a hollow cylindrical shape and the core glass rod are welded and integrated each other to form a core/cladding glass rod having an external diameter of 300 μm and a diameter of the core of 295 μm (a layer of the cladding is to have a thickness of 2.5 μm). In the Table 1, 3 and Table 2 given later, the amount of the colorant is expressed as percent by weight taking the total amount of the base glass except for the colorant as 100 wt. %.

After being cut into a piece having a length of about 1 m, the glass rod is soaked to the molten salt of sodium nitrate maintained at about 445° C. for about 24 hours in a bath so as to exchange the lithium ion existing in the glass rod and the sodium ion existing in the molten salt. After that, the rod lens is taken out of the bath to be cut and polished in the both ends thereof so as to form a rod lens having a length of 4.13 or 4.01 mm which has distribution of the refractive index. Table 4 shows the external diameter, the length, the refractive index on the center axis ($n_0$), the constant of the refractive index (g) and TC (the distance between an object and an erect image thereof which are imaged at an equivalent magnification) in respect to the rod lens, in which the constant of the refractive index (g) is an constant determined in such a manner that the refractive index on the center axis is expressed as $n_0$ and the distribution of the refractive index (n) in the direction of the radius (r) is approximated in accordance with the following equation:

$$n = n_0(1 - gr^2).$$

The refractive index exhibits a continuous variation at the boundaries between the core and the cladding.

About 200 pieces of the refractive index distribution type rod lens are arranged into two columns to form a zigzag configuration in such a manner that all the optical axes of the pieces are mutually parallel and then mutually adhered by adhesives to form a rod lens array. The rod lens array is measured in the value of MTF (Modulation Transfer Function) over the wavelength of 470 nm, 530 nm and 660 nm taking the spacial frequency of the grid pattern as 12 Lp/mm and using the white light as the illuminant. The result is shown in Table 4. MTF expresses the ratio of contrast between an object and an image thereof as a function of the spacial frequency. As MTF approaches 100%, the origin is faithfully reproduced on the image with a high resolution.

In Comparative Example 2 containing the colorant comprising CoO, MnO and $Cr_2O_3$, the optical properties of the rod lens array cannot be measured because devitrification often occurs in the cladding glass during hot drawing process in the oven and, as the result, the diameter of the obtained double glass is made inhomogeneous.

Examples 2 through 10

Figure 2:
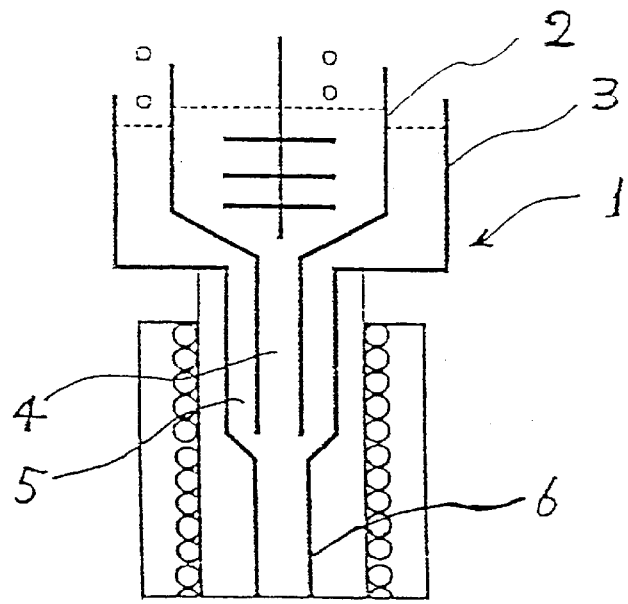
FIG. 2 is a sectional view of a spinning furnace to produce a double structured glass rod for the refractive index distribution type rod lens of the present invention.

Double structured glass rods of which the core and the cladding contain the composition of shown in Table 1 and 2 are produced by spinning process using a double crucible in the manner as follows. In FIG. 2, the double crucible 1 comprises an inner crucible 2 and an outer crucible 3. The glass cullet for the core glass is fed into the inner crucible 2 and that for the cladding glass is fed into the outer crucible 3, and which are heated and melted respectively in the crucible 1. Then, the core glass 4 is pulled out of the inner crucible 2 and the cladding glass 5 containing the colorant is pulled out of the outer crucible 3 respectively from a lower nozzle 6 to make the core/cladding glass rod by using the drawing roller (not shown) so that the core glass and the cladding glass are welded each other to be integrated. Each of the resulted glass rods is treated with the ion exchange process in the same manner as Example 1 to produce the rod lens and the rod lens array thereof and the optical properties thereof are measured and shown in Table 4.

Figure 3:
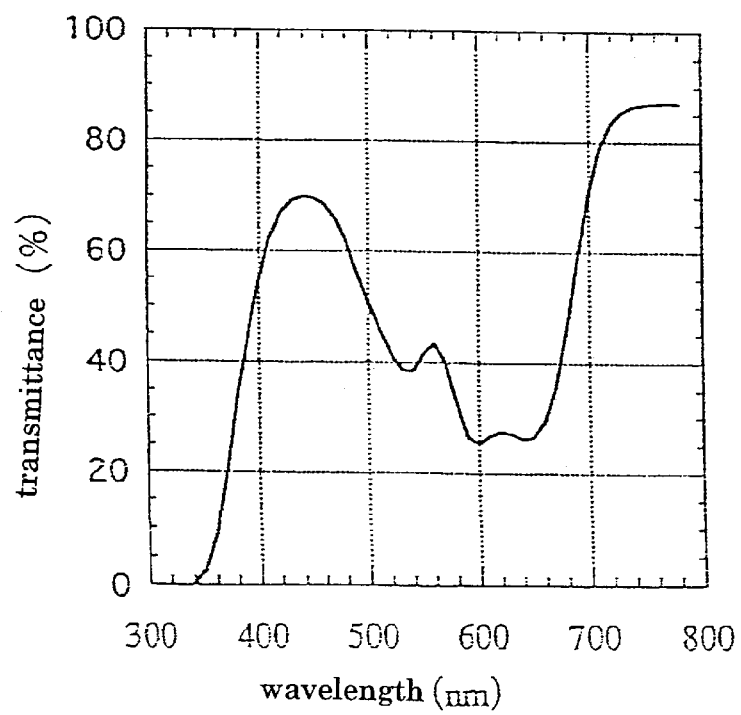
FIG. 3 is a graph of the spectral transmittance characteristics of the cladding glass of Example 1.
Figure 4:
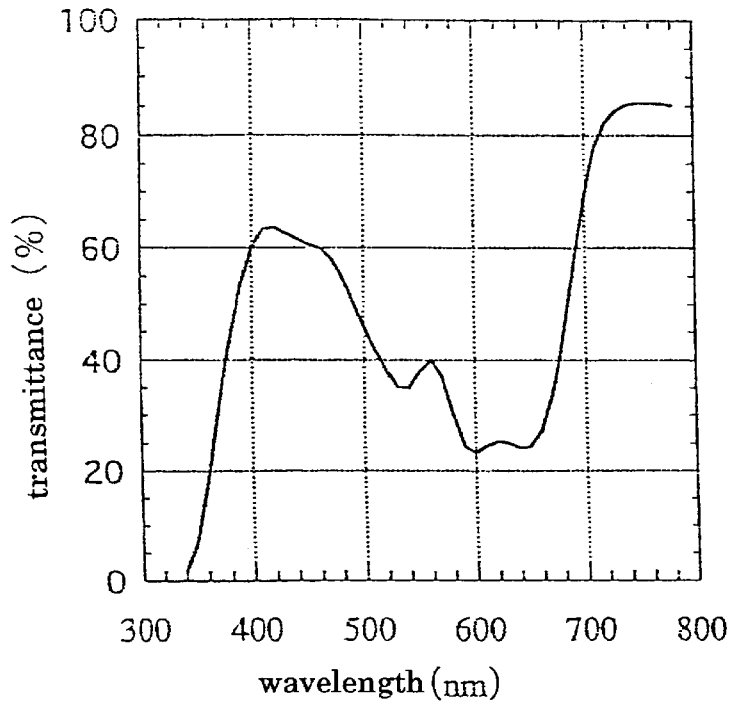
FIG. 4 is a graph of the spectral transmittance characteristics of the cladding glass of Example 3.
Figure 5:
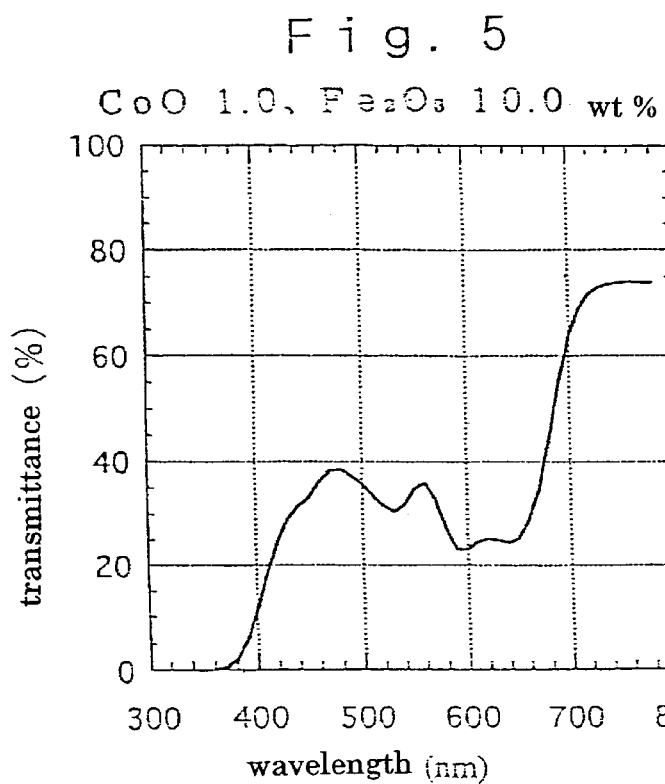
FIG. 5 is a graph of the spectral transmittance characteristics of the cladding glass of Example 4.
Figure 6:
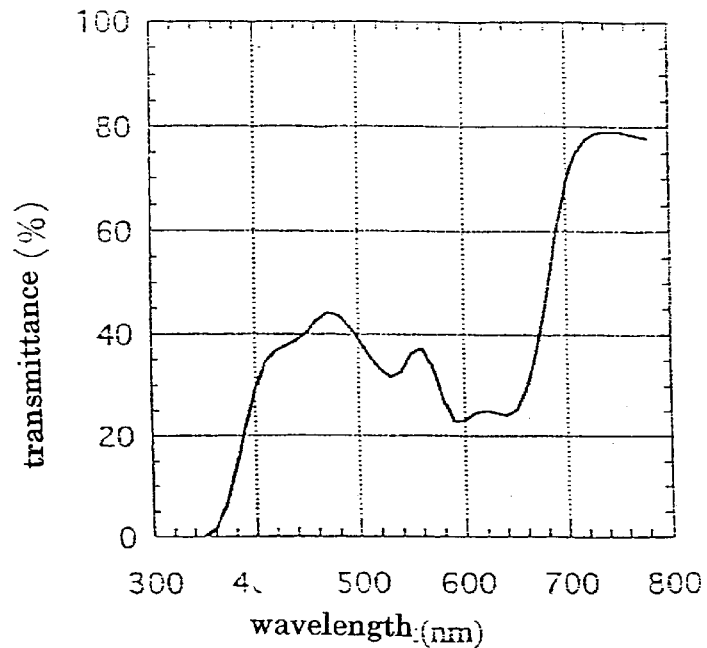
FIG. 6 is a graph of the spectral transmittance characteristics of the cladding glass of Example 5.
Figure 7:
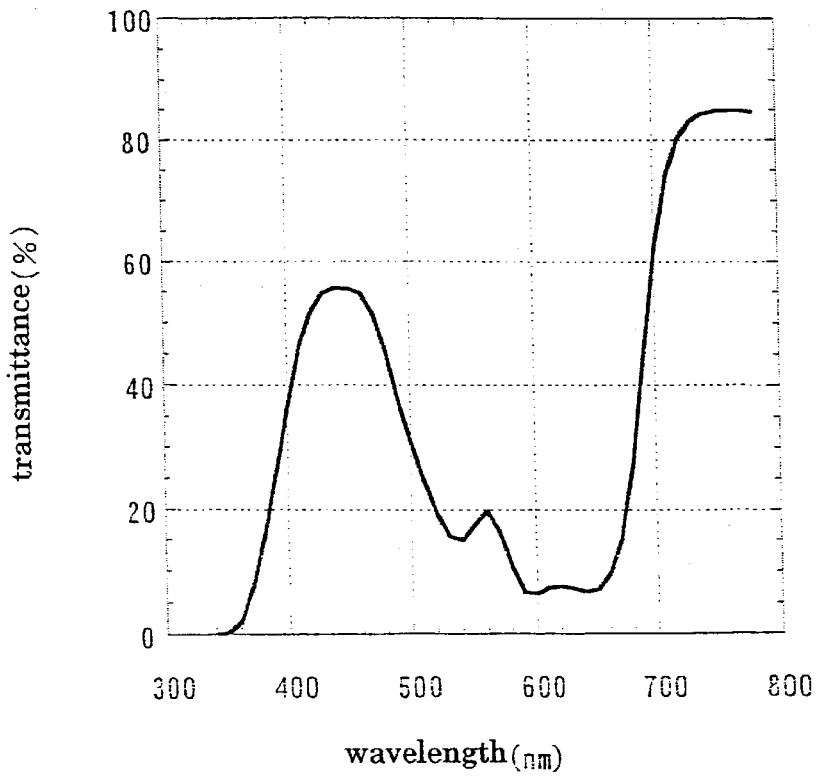
FIG. 7 is a graph of the spectral transmittance characteristics of the cladding glass of Example 6.
Figure 8:
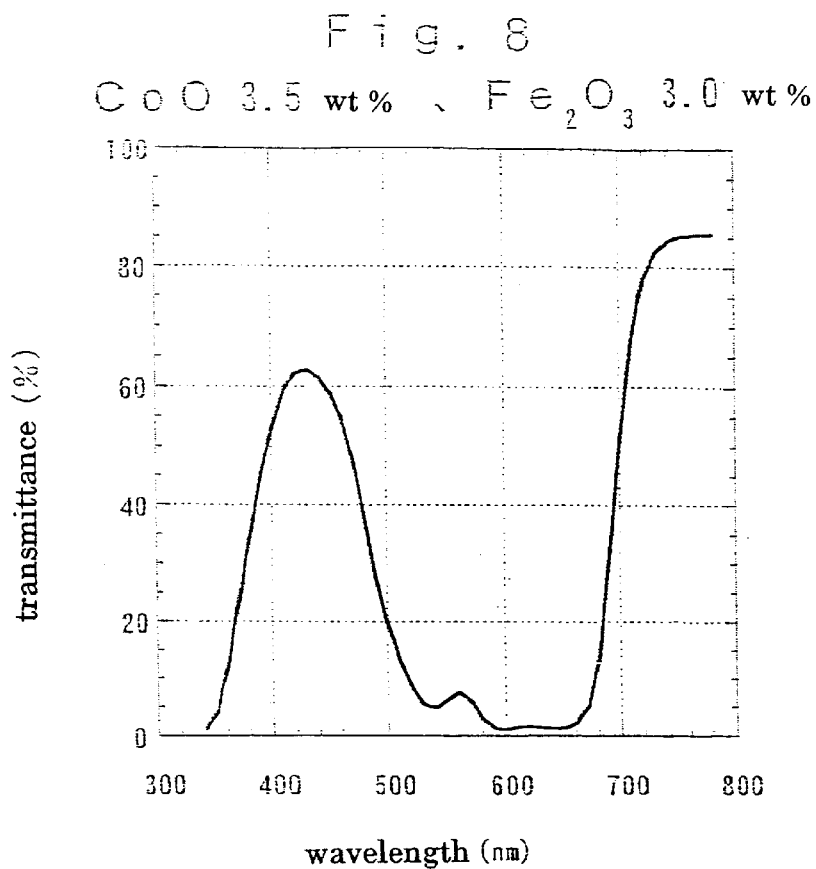
FIG. 8 is a graph of the spectral transmittance characteristics of the cladding glass of Example 7.
Figure 9:
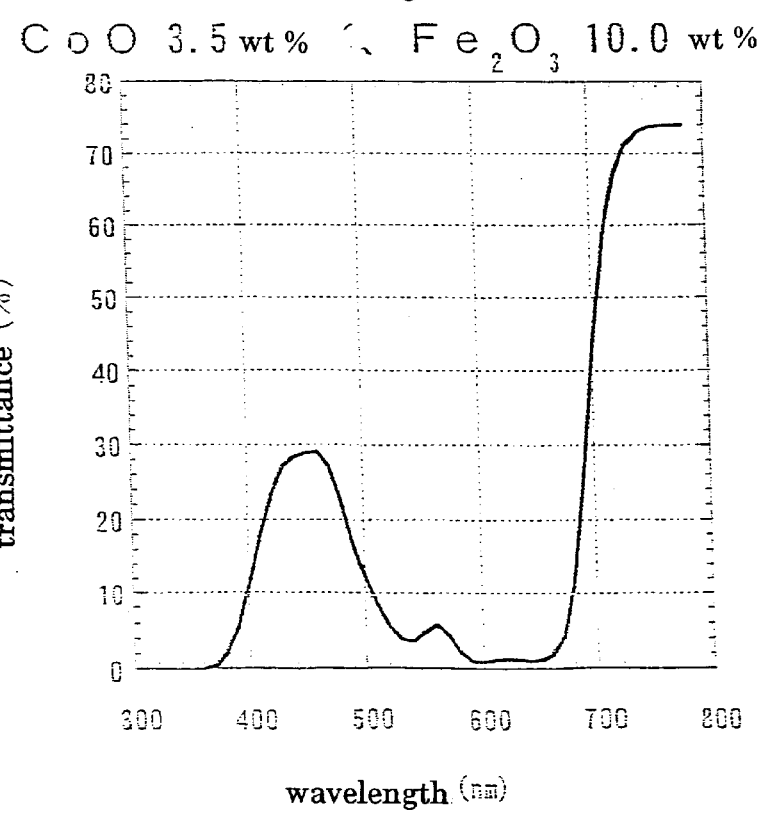
FIG. 9 is a graph of the spectral transmittance characteristics of the cladding glass of Example 8.
Figure 10:
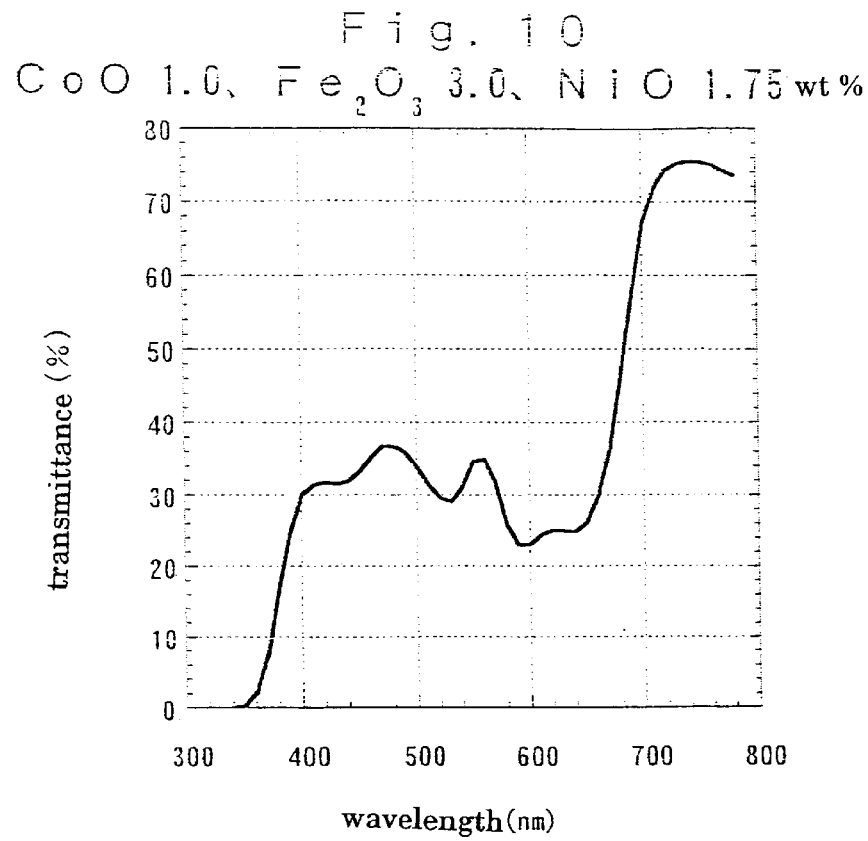
FIG. 10 is a graph of the spectral transmittance characteristics of the cladding glass of Example 9.
Figure 11:
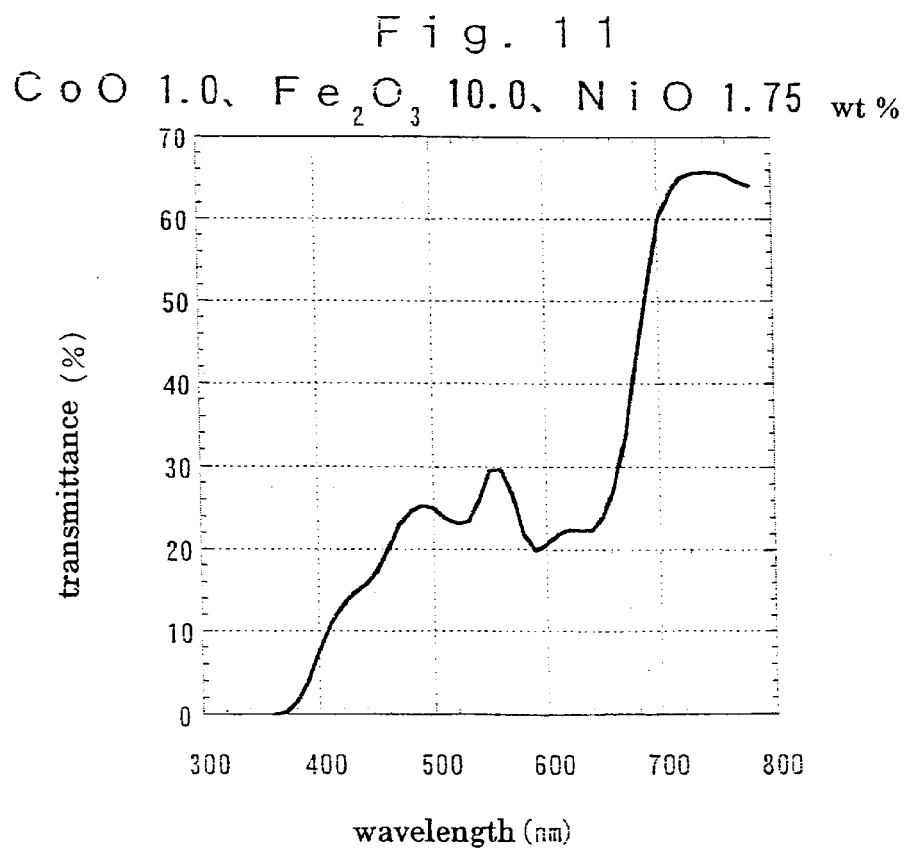
FIG. 11 is a graph of the spectral transmittance characteristics of the cladding glass of Example 10.
Figure 12:
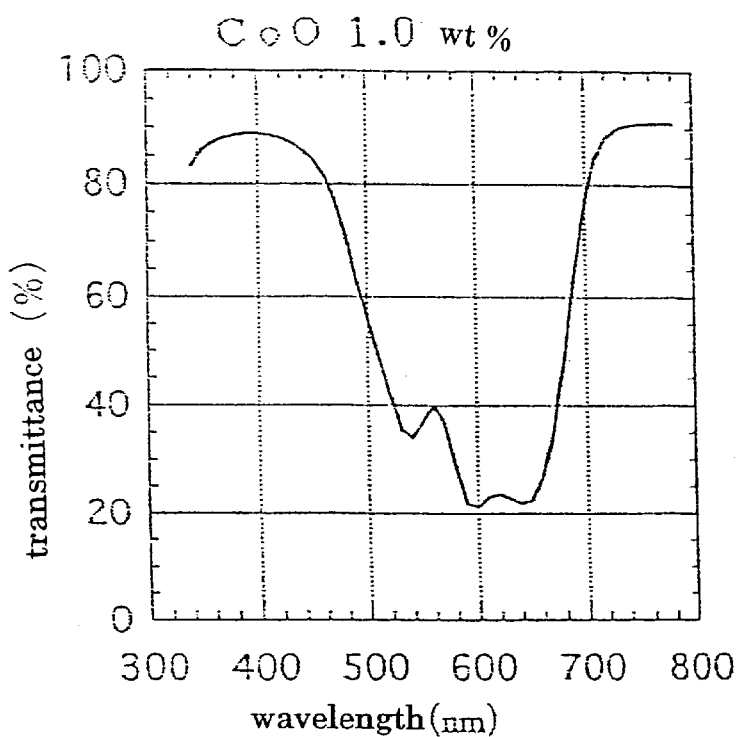
FIG. 12 is a graph of the spectral transmittance characteristics of the cladding glass of Comparative Example 1.
Figure 13:
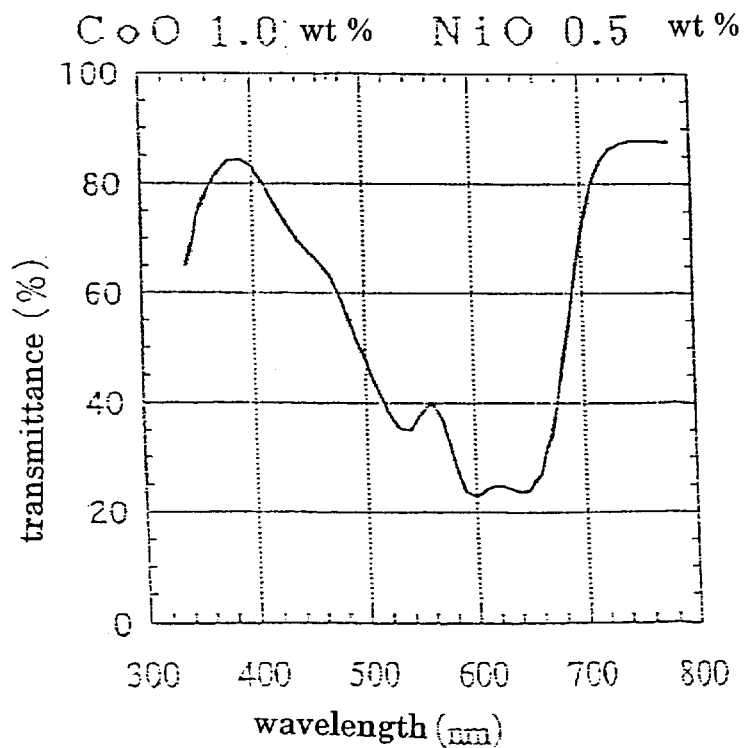
FIG. 13 is a graph of the spectral transmittance characteristics of the cladding glass of Comparative Example 3.

In terms of the cladding glass of aforementioned Examples and Comparative Examples, the spectral transmittance characteristics of the cladding glass of Example 1 (containing 1.0 wt. % CoO and 3.0 wt. % $Fe_2O_3$) is shown in FIG. 3 (in which the thickness of the glass is expressed as 0.1 mm), Example 3 (containing 1.0 wt. % CoO, 2.0 wt. % $Fe_2O_3$ and 0.5 wt. % NiO) is shown in FIG. 4 (in which the thickness of the glass is expressed as 0.1 mm), Example 4 (containing 1.0 wt. % CoO and 10.0 wt. % $Fe_2O_3$) is shown in FIG. 5 (in which the thickness of the glass is expressed as 0.1 mm), Example 5 (containing 1.0 wt. % CoO, 6.0 wt. % $Fe_2O_3$ and 1.0 wt. % NiO) is shown in FIG. 6 (in which the thickness of the glass is expressed as 0.1 mm), Example 6 (containing 2.0 wt. % CoO and 6.0 wt. % $Fe_2O_3$) is shown in FIG. 7 (in which the thickness of the glass is expressed as 0.1 mm), Example 7 (containing 3.5 wt. % CoO and 3.0 wt. % $Fe_2O_3$) is shown in FIG. 8 (in which the thickness of the glass is expressed as 0.1 mm), Example 8 (containing 3.5 wt. % CoO and 10.0 wt. % $Fe_2O_3$) is shown in FIG. 9 (in which the thickness of the glass is expressed as 0.1 mm), Example 9 (containing 1.0 wt. % CoO, 3.0 wt. % $Fe_2O_3$ and 1.75 wt. % NiO) is shown in FIG. 10 (in which the thickness of the glass is expressed as 0.1 mm), Example 10 (containing 1.0 wt. % CoO, 10.0 wt. % $Fe_2O_3$ and 1.75 wt. % NiO) is shown in FIG. 11 (in which the thickness of the glass is expressed as 0.1 mm), Comparative Example 1 (containing 1.0 wt. % CoO) is shown in FIG. 12 (in which the thickness of the glass is expressed as 0.1 mm), and Comparative Example 3 (containing 1.0 wt. % CoO and 0.5 wt. % NiO) is shown in FIG. 13 (in which the thickness of the glass is expressed as 1 mm).

TABLE 1

| | Examples | | | | | | | | | |
|---|---|---|---|---|---|---|---|---|---|---|
| | 1 | | 2 | | 3 | | 4 | | 5 | |
| | core | cladding | core | cladding | core | cladding | core | cladding | core | cladding |
| | base glass component [wt. %] | | | | | | | | | |
| $Li_2O$ | 4.2 | 0.0 | 5.5 | 0.0 | 4.2 | 0.0 | 4.2 | 0.0 | 4.2 | 0.0 |
| $Na_2O$ | 8.3 | 16.4 | 7.6 | 17.9 | 8.3 | 16.4 | 8.3 | 16.6 | 8.3 | 16.6 |
| MgO | 8.4 | 8.1 | 8.0 | 7.6 | 8.4 | 8.1 | 8.4 | 4.5 | 8.4 | 4.5 |
| PbO | 20.0 | 19.1 | 19.2 | 18.1 | 20.0 | 19.1 | 20.0 | 19.1 | 20.0 | 19.1 |
| BaO | 4.6 | 4.4 | 5.0 | 4.7 | 4.6 | 4.4 | 4.6 | 4.3 | 4.6 | 4.3 |
| $TiO_2$ | 4.2 | 4.0 | 6.2 | 5.9 | 4.2 | 4.0 | 4.2 | 3.7 | 4.2 | 3.7 |
| $SiO_2$ | 50.3 | 48.0 | 48.5 | 45.8 | 50.3 | 48.0 | 50.3 | 51.8 | 50.3 | 51.8 |

TABLE 1-continued

| | Examples | | | | | | | | | |
|---|---|---|---|---|---|---|---|---|---|---|
| | 1 | | 2 | | 3 | | 4 | | 5 | |
| | core | cladding | core | cladding | core | cladding | core | cladding | core | cladding |
| colorant [wt. %] | | | | | | | | | | |
| CoO | 0 | 1.0 | 0 | 1.0 | 0 | 1.0 | 0 | 1.0 | 0 | 1.0 |
| $Fe_2O_3$ | 0 | 3.0 | 0 | 3.0 | 0 | 2.0 | 0 | 10.0 | 0 | 6.0 |
| NiO | 0 | 0 | 0 | 0 | 0 | 0.5 | 0 | 0 | 0 | 1.0 |
| MnO | 0 | 0 | 0 | 0 | 0 | 0 | 0 | 0 | 0 | 0 |
| $Cr_2O_3$ | 0 | 0 | 0 | 0 | 0 | 0 | 0 | 0 | 0 | 0 |

TABLE 2

| | Examples | | | | | | | | | |
|---|---|---|---|---|---|---|---|---|---|---|
| | 6 | | 7 | | 8 | | 9 | | 10 | |
| | core | cladding | core | cladding | core | cladding | core | cladding | core | cladding |
| base glass component [wt. %] | | | | | | | | | | |
| $Li_2O$ | 4.2 | 0.0 | 4.2 | 0.0 | 4.2 | 0.0 | 4.2 | 0.0 | 4.2 | 0.0 |
| $Na_2O$ | 8.3 | 16.6 | 8.3 | 16.6 | 8.3 | 16.6 | 8.3 | 16.6 | 8.3 | 16.6 |
| MgO | 8.4 | 4.5 | 8.4 | 4.5 | 8.4 | 4.5 | 8.4 | 4.5 | 8.4 | 4.5 |
| PbO | 20.0 | 19.1 | 20.0 | 19.1 | 20.0 | 19.1 | 20.0 | 19.1 | 20.0 | 19.1 |
| BaO | 4.6 | 4.3 | 4.6 | 4.3 | 4.6 | 4.3 | 4.6 | 4.3 | 4.6 | 4.3 |
| $TiO_2$ | 4.2 | 3.7 | 4.2 | 3.7 | 4.2 | 3.7 | 4.2 | 3.7 | 4.2 | 3.7 |
| $SiO_2$ | 50.3 | 51.8 | 50.3 | 51.8 | 50.3 | 51.8 | 50.3 | 51.8 | 50.3 | 51.8 |
| colorant [wt. %] | | | | | | | | | | |
| CoO | 0 | 2.0 | 0 | 3.5 | 0 | 3.5 | 0 | 1.0 | 0 | 1.0 |
| $Fe_2O_3$ | 0 | 6.0 | 0 | 3.0 | 0 | 10.0 | 0 | 3.0 | 0 | 10.0 |
| NiO | 0 | 0 | 0 | 0 | 0 | 0 | 0 | 1.75 | 0 | 1.75 |
| MnO | 0 | 0 | 0 | 0 | 0 | 0 | 0 | 0 | 0 | 0 |
| $Cr_2O_3$ | 0 | 0 | 0 | 0 | 0 | 0 | 0 | 0 | 0 | 0 |

TABLE 3

| | Comparative Examples | | | | | | | |
|---|---|---|---|---|---|---|---|---|
| | 1 | | 2 | | 3 | | 4 | |
| | core | cladding | core | cladding | core | cladding | core | cladding |
| base glass component [wt. %] | | | | | | | | |
| $Li_2O$ | 4.2 | 0.0 | 4.2 | 0.0 | 4.2 | 0.0 | 4.2 | 0.0 |
| $Na_2O$ | 8.3 | 16.4 | 8.3 | 16.4 | 8.3 | 16.4 | 8.3 | 16.4 |
| MgO | 8.4 | 8.1 | 8.4 | 8.1 | 8.4 | 8.1 | 8.4 | 8.1 |
| PbO | 20.0 | 19.1 | 20.0 | 19.1 | 20.0 | 19.1 | 20.0 | 19.1 |
| BaO | 4.6 | 4.4 | 4.6 | 4.4 | 4.6 | 4.4 | 4.6 | 4.4 |
| $TiO_2$ | 4.2 | 4.0 | 4.2 | 4.0 | 4.2 | 4.0 | 4.2 | 4.0 |
| $SiO_2$ | 50.3 | 48.0 | 50.3 | 48.0 | 50.3 | 48.0 | 50.3 | 48.0 |
| colorant [wt. %] | | | | | | | | |
| CoO | 0 | 1.0 | 0 | 1.0 | 0 | 1.0 | 0 | 1.0 |
| $Fe_2O_3$ | 0 | 0 | 0 | 0 | 0 | 0 | 0 | 0 |
| NiO | 0 | 0 | 0 | 0 | 0 | 0.5 | 0 | 0 |
| MnO | 0 | 0 | 0 | 0.75 | 0 | 0 | 0 | 1.5 |
| $Cr_2O_3$ | 0 | 0 | 0 | 0.25 | 0 | 0 | 0 | 0 |

TABLE 4

|  | Examples | | | | | | | | | | Comparative Examples | | | |
| --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 1 | 2 | 3 | 4 |
| external diameter [mm] | 0.30 | 0.30 | 0.30 | 0.30 | 0.30 | 0.30 | 0.30 | 0.30 | 0.30 | 0.30 | 0.30 | — | 0.30 | 0.30 |
| length [mm] | 4.13 | 4.01 | 4.13 | 4.13 | 4.13 | 4.13 | 4.13 | 4.13 | 4.13 | 4.13 | 4.13 | — | 4.13 | 4.13 |
| refractive index on center axis ($n_0$) | 1.612 | 1.630 | 1.612 | 1.612 | 1.612 | 1.612 | 1.612 | 1.612 | 1.612 | 1.612 | 1.612 | — | 1.612 | 1.612 |
| constant of refractive index (g) | 0.891 | 0.930 | 0.891 | 0.891 | 0.891 | 0.891 | 0.891 | 0.891 | 0.891 | 0.891 | 0.891 | — | 0.891 | 0.891 |
| TC [mm] | 9.20 | 8.37 | 9.20 | 9.20 | 9.20 | 9.20 | 9.20 | 9.20 | 9.20 | 9.20 | 9.20 | — | 9.20 | 9.20 |
| MTF | | | | | | | | | | | | | | |
| 470 nm | 71.8 | 71.6 | 72.3 | 76.0 | 75.4 | 73.2 | 72.5 | 75.3 | 75.2 | 76.5 | 51.5 | — | 54.0 | 56.2 |
| 530 nm | 73.8 | 73.9 | 74.5 | 75.3 | 74.8 | 76.5 | 77.3 | 77.2 | 75.0 | 75.1 | 75.O | — | 73.8 | 73.4 |
| 660 nm | 75.6 | 75.5 | 76.1 | 75.9 | 75.7 | 77.1 | 77.7 | 77.6 | 75.8 | 75.6 | 75.3 | — | 71.1 | 72.0 |

Compared with Comparative Examples 1, 3 and 4, Examples 1 through 10 are provided with high values of MTF over wavelengths of 470 nm, 530 nm and 660 nm respectively. In contrast, Comparative Examples 1, 3 and 4 have low values of MTF at a wavelength of 470 nm, and it exhibits that these Comparative Examples are lowered in resolution when the white light is employed for the illuminant. While being identical to each other in the composition of the colorant and different from each other in that of the base glass of the core and the cladding, Examples 1 and 2 are free of devitrification. In contrast, despite the same composition of the base glass of the core and the cladding as Example 1, devitrification occurs in Comparative Example 2.

As detailed above, according to the present invention, a refractive index distribution type rod lens, which has the exceedingly high external diameter precision, and which is less or not affected by the light passing through the peripheral portion where the refractive index is disorderly distributed, and prevents the entrance of the flare light so as to provide the good resolution even when used in the optical device employing the white light for the illuminant, and a rod lens array thereof can be provided by treating a double glass rod, which has the core/cladding structure and contains the colorant comprising at least Co and Fe in the cladding glass, with the ion exchange process.

What is claimed is:

1. A refractive index distribution type optical element having a core/cladding structure produced with an ion exchange method, said a refractive index distribution type optical element including colorant of metal oxides in cladding glass thereof,
    wherein said cladding glass consisting of base glass and said colorant of the metal oxides comprises:
        0.3 to 4.0 wt. % CoO;
        1.0 to 12.0 wt. % $Fe_2O_3$;
        0.0 to 2.0 wt. % NiO; and
        0.0 to 0.2 wt. % $Cr_2O_3$
    when the total amount of the base glass except for the colorants is taken as 100 wt. %.

2. A refractive index distribution type optical element as claimed in claim 1, wherein the cladding glass including the colorant of the metal oxides comprises:
    0.5 to 1.5 wt. % CoO;
    1.5 to 4.0 wt. % $Fe_2O_3$; and
    0 wt. % NiO;
    when the total amount of the base glass except for the colorants is taken as 100 wt. %.

3. A refractive index distribution type optical element as claimed in claim 1, wherein the cladding glass including the colorant of the metal oxides comprises:
    0.5 to 1.5 wt. % CoO;
    1.0 to 2.5 wt. % $Fe_2O_3$; and
    0.2 to 2.0 wt. % NiO;
    when the total amount of the base glass except for the colorants is taken as 100 wt. %.

4. A refractive index distribution type optical element as claimed in claim 2, wherein the base glass includes equal to or more than 5 wt. % MgO when the total amount of the base glass is taken as 100 wt. %.

5. A refractive index distribution type optical element as claimed in claim 1, wherein the cladding glass including the colorant of the metal oxide comprises:
    0.5 to 1.5 wt. % CoO;
    6.0 to 12.0 wt. % $Fe_2O_3$; and
    0 wt. % NiO;
    when the total amount of the base glass except for the colorants is taken as 100 wt. %.

6. A refractive index distribution type optical element as claimed in claim 1, wherein the cladding glass including the colorant of the metal oxide comprises:
    0.5 to 1.5 wt. % CoO;
    5.0 to 8.0 wt. % $Fe_2O_3$; and
    0.2 to 2.0 wt. % NiO;
    when the total amount of the base glass except for the colorants is taken as 100 wt. %.

7. A refractive index distribution type optical element as claimed in claim 5, wherein the base glass includes less than 5 wt. % MgO when the total amount of the base glass is taken as 100 wt. %.

8. A refractive index distribution type optical element as claimed in claim 1, wherein the cladding glass comprises the base glass, on average, comprising:
    0.5 to 12 wt. % $Li_2O$;
    14 to 28 wt. % $Na_2O$ wherein the total amount of $Li_2O$ and $Na_2O$ is in a range of 15 to 29 wt. %;

2.5 to 15 wt. % MgO;
2 to 10 wt. % BaO;
0 to 25 wt. % PbO;
2 to 10 wt. % $TiO_2$; and
45 to 60 wt. % $SiO_2$,
and the glass constituting the core, on the average, comprising:
2 to 9 wt. % $Li_2O$;
0.5 to 25 wt. % $Na_2O$ wherein the total amount of $Li_2O$ and $Na_2O$ is in a range of 4 to 29 wt. %;
2.5 to 15 wt. % MgO;
2 to 10 wt. % BaO;
0 to 25 wt. % PbO;
2 to 10 wt. % $TiO_2$; and
45 to 60 wt. % $SiO_2$,
wherein the content of $Na_2O$ in the cladding glass is larger than that in the glass constituting the core and the content of $Li_2O$ in the glass constituting the core is larger than that in the cladding glass.

9. A refractive index distribution type optical element as claimed in claim 1, wherein the cladding glass thereof has a thickness in a range of 1 to 100 μm, and which having a thickness of 100 μm exhibits the transmittance of equal to or less than 75% in relation to the whole lights having wave lengths in a range of 380 to 680 nm.

10. A refractive index distribution type optical element as claimed in claim 1, wherein the glass of the core thereof has a diameter in a range of 100 to 1000 μm and the cladding glass thereof has a thickness in a range of 1 to 25% in relation to the diameter of the glass of the core.

11. A refractive index distribution type rod lens array being composed of plural refractive index distribution type optical elements as claimed in claim 1, wherein the plural pieces of the optical elements are arranged in such a manner that all optic axes thereof are mutually parallel, and said elements are adhered to each other.

* * * * *